March 30, 1948.    A. G. LADRACH    2,438,506
ELECTROMAGNETIC GAUGE
Filed Nov. 25, 1943    2 Sheets-Sheet 1
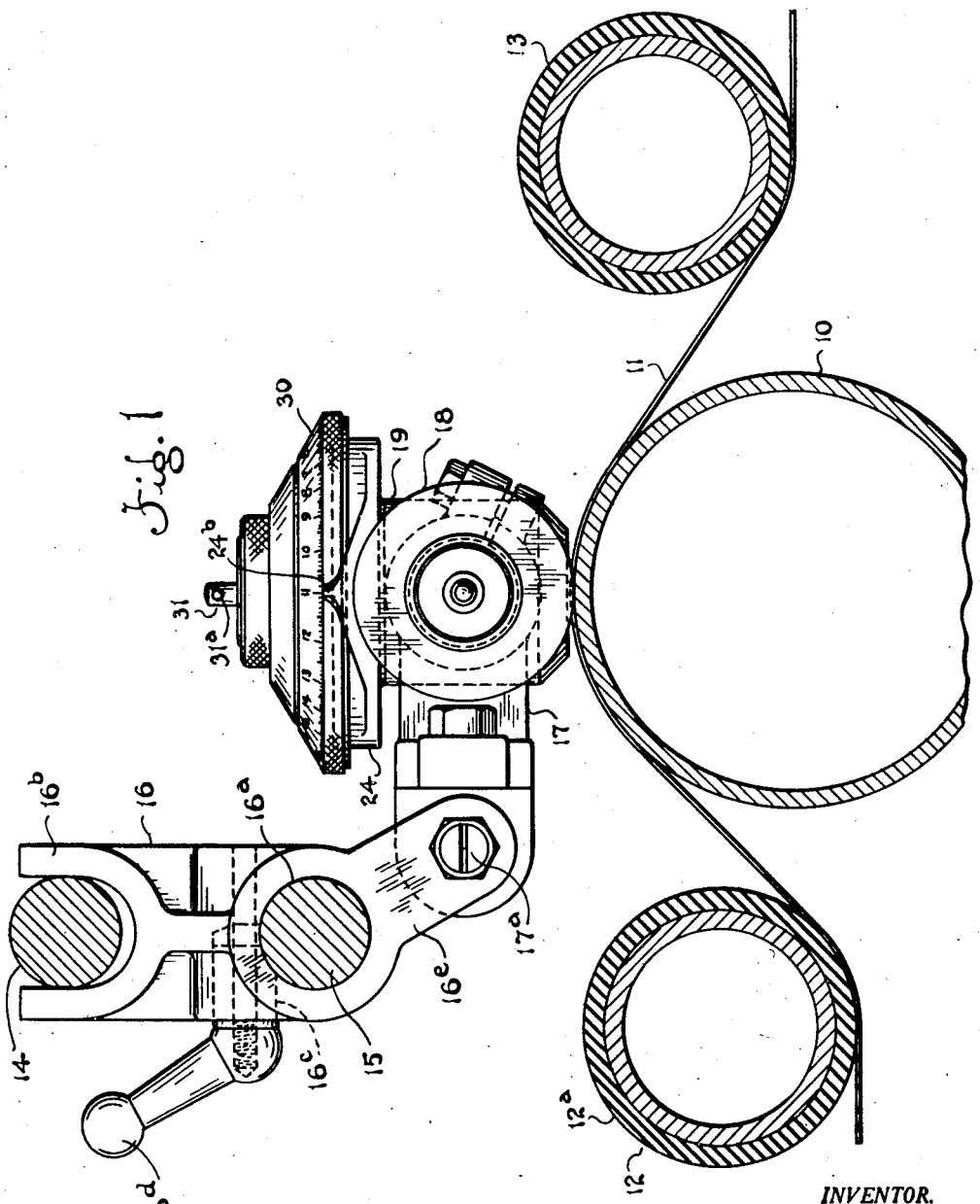
INVENTOR.
Aaron G. Ladrach
BY
J Ralph Barrow March 30, 1948.  A. G. LADRACH  2,438,506
ELECTROMAGNETIC GAUGE
Filed Nov. 25, 1943  2 Sheets-Sheet 2
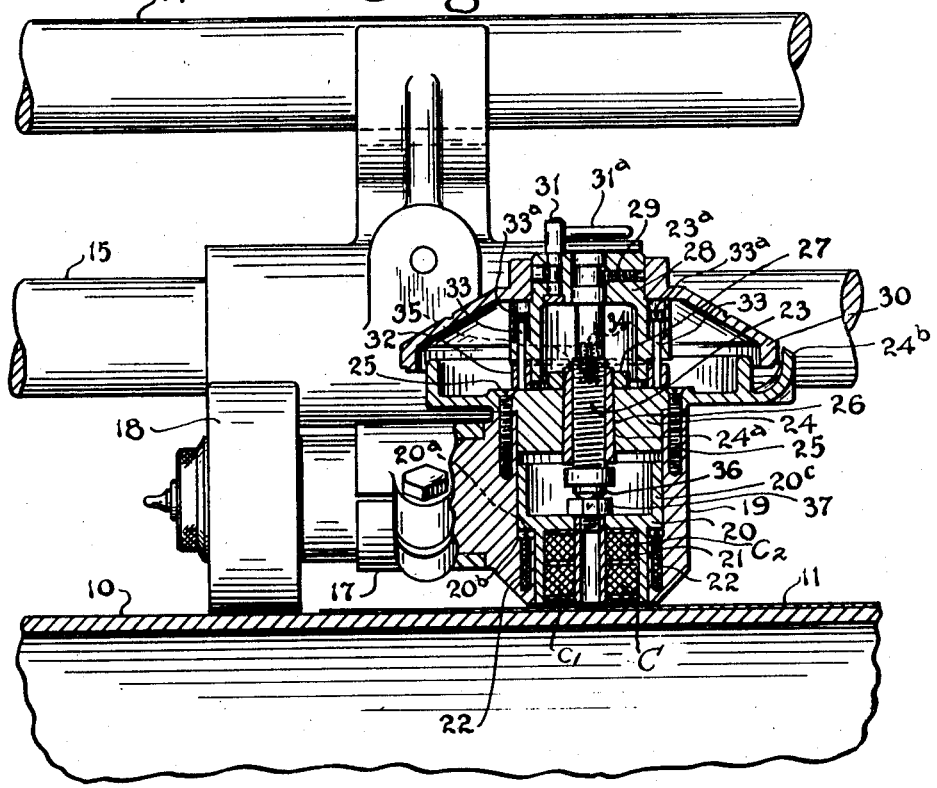
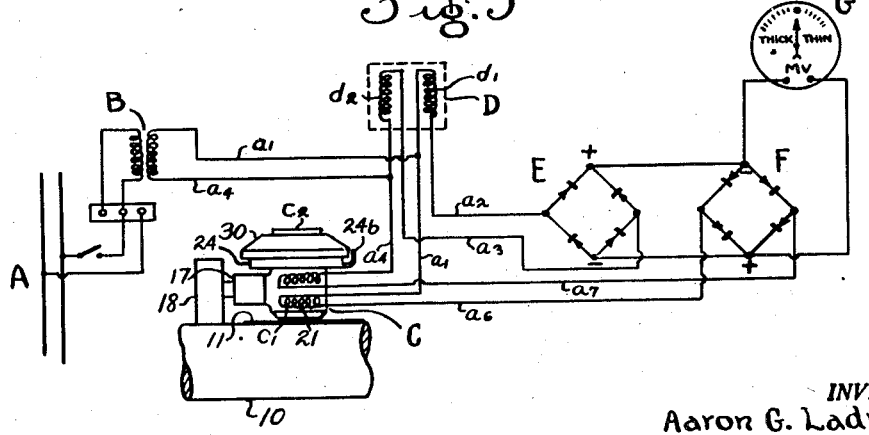
INVENTOR.
Aaron G. Ladrach
BY J Ralph Barrow Patented Mar. 30, 1948

2,438,506

UNITED STATES PATENT OFFICE 2,438,506

ELECTROMAGNETIC GAUGE

Aaron G. Ladrach, Akron, Ohio; Dorothy B. Ladrach, administratrix of said Aaron G. Ladrach, deceased, assignor, by mesne assignments, to Niles-Bement-Pond Company, West Hartford, Conn., a corporation of New Jersey Application November 25, 1943, Serial No. 511,696

12 Claims. (Cl. 175—183)

1

This invention relates to electromagnetic devices for gauging the thickness of materials.

One of the purposes of the invention is to provide an electromagnetic gauge for magnetic materials in which there is a magnetic field having therein an air gap in which the magnetic material to be gauged is arranged, the variations in thickness of magnetic material arranged in said gap varying the width of the resultant air gap in said magnetic field.

Another purpose of the invention is to provide in an electromagnetic gauge an electromagnetic means in association with a support of magnetic material, said electromagnetic means and said support being relatively adjustable, so as to predetermine the desired gauge of a material to be measured in such a way as to allow the electromagnetic means to indicate slight variations from said predetermined gauge.

A further purpose of the invention is to attain one or more of the foregoing purposes in a gauging device in which the gauging means responsive to the variations in the thickness of the material to be gauged does not contact said material.

A further purpose of the invention is to attain one or more of the foregoing purposes in a continuous gauging device.

A further purpose of the invention is to provide in a continuous gauging device for indicating variations in the thickness of material being passed in association therewith of a carriage for an electromagnetic gauging element and means such as a micrometer on said carriage for adjusting the relative position of said electromagnetic gauging element thereon.

A further purpose of the invention is to provide a carriage as set forth in the preceding paragraph, including means for supporting said carriage in association with material to be gauged without contacting the carriage with the surface of the material being gauged.

The foregoing and other purposes of the invention are attained in the continuous electromagnetic gauging device illustrated in the accompanying drawings and described below. It is to be understood that the invention is not limited to the specific form thereof shown and described.

Of the accompanying drawings:

Figure 1 is a side elevation partly in section showing the invention embodied in a gauging device through which sheet magnetic material is continuously passed, an installation such as might be used for continuously gauging sheet steel in a steel mill;

Figure 2 is a front elevation of said gauging

2 device partly in section, said elevation being of the device as viewed from the right of Figure 1; and Figure 3 is a diagrammatic view of a suitable circuit in which the gauging electromagnet may be connected to a galvanometer for indicating thickness variations of the magnetic material being gauged.

Referring to the drawings, the numeral 10 indicates a roller of magnetic material over which sheet or strip magnetic material indicated at 11 may be continuously passed, the material 11 being trained under a roller 12, which may have a surface of soft rubber or the like frictional material, 12a, in advance of said roller 10, and under a roller similar to roller 12, indicated at 13, as the sheet magnetic material passes out of the gauging device, the rollers 12 and 13 holding the material 11 snugly about the upper surface of roller 10 to permit accurate gauging thereof.

Arranged above and in advance of the roller 10, there may be a pair of transverse bars 14 and 15, the former positioned above the latter, and in association with which there is arranged a support 16 adapted to slide along the bars 14 and 15 width-wise of the equipment shown. The support 16 has a bore 16a therein, whereby it is slidably fitted on the cross bar 15 and has a yoke 16b thereon embracing the bar 14. A suitable and well-known type of cam lock 16c may be arranged on the support 16 to be operated by a handle 16d to lock the support 16 to bar 15 so as to secure the gauging device in any desired width-wise position. The support 16 has an arm 16e thereon upon which the electromagnetic gauging carriage indicated generally by number 17 may be pivoted as at 17a so as to extend in the direction of movement of stock 11. The gauging carriage 17 has journaled thereon a roller 18 which is arranged to rotate in frictional engagement with the surface of roller 10 to one side of and out of contact with the sheet magnetic material 11 being gauged (see Figure 2).

A housing 19 secured on the carriage 17 has arranged therein an adjustable receptacle 20 for an electromagnet 21, said receptacle 20 being vertically slidable in the housing 19 and having a shoulder 20a for engaging a shoulder at 20b on said housing 19 to limit downward adjustment of the electromagnet 21. Compression springs 22, 22 in said housing 19 are arranged normally, by engagement with shoulder 20a, to urge the receptacle 20 upwardly, said receptacle having an upwardly extending sleeve 20c for guiding the vertical movement of the receptacle in the bore in housing 19 in which said receptacle is arranged. Thus, although the bottom of housing 19 is maintained at a fixed working distance from the surface of roller 10, the relative distance of the gauging electromagnet from roller 10 is variable for purposes to be described.

To adjust the gauging electromagnet 21 toward and from the surface of the roller 10, there is provided a micrometer screw 23 which is threaded through the relatively fixed element 24 of a micrometer, this element 24 being secured as by screws 25, 25 to the housing 19. The micrometer screw 23 may be arranged in threaded engagement with a tapered sleeve 26 inserted upwardly from below in a correspondingly tapered bore 24a and secured in said bore by a nut 27 in threaded engagement with the upper end of sleeve 26, the nut 27 being tightened against the top of the relatively fixed micrometer element 24. The micrometer screw 23 has an upward extension at 23a on which is secured a hub 28 as by set screws indicated at 29. A micrometer dial member 30 may be releasably connected to said hub 28 as by a suitable cam lock device of a known type 31, operated by handle 31a and mounted on said hub 28 for locking engagement with dial member 30. Dial member 30 as seen in Figure 1, may carry thereon graduations for indicating the degree of adjustment of the micrometer screw 23. Element 24 carries a relatively fixed indicator 24b in association with the graduations on dial member 30.

To hold a setting of the micrometer against accidental dislocation disturbing a setting of the micrometer, there is arranged on hub 28 a friction ring 32, having secured thereto guide pins 33, 33 slidable through vertical bores in the hub as shown, and preferably having heads thereon as at 33a, arranged in enlarged upward extensions of the bores in which the pins 33 are slidable. Compression springs 34 arranged in opposed sockets 35 respectively in hub 28 and ring 32 are provided yieldingly to urge ring 32 into frictional engagement with the top of the relatively fixed element 24 of the micrometer in all positions of adjustment of the micrometer screw.

The micrometer screw 23 has on its lower end a rounded, hardened, wear-resisting bearing member 36, rotatably bearing upon a correspondingly wear-resisting hard bearing member 37 on the receptacle 20 for adjusting the receptacle 20 in various positions of vertical adjustment in the housing 19 on carriage 17.

The gauging electromagnet 21 may be arranged in a suitable gauging circuit as indicated in Figure 3 or in such circuits as are disclosed in Patent No. 2,299,997, issued October 27, 1942, the gauging circuit used with the gauging electromagnet being, per se, as any well-known type of balancing circuit to use with electromagnetic gauges. Briefly describing the gauging or balancing circuit shown, there may be a 110 volt source at A connected through a transformer indicated generally at B, to the gauging magnetic coils C of electromagnet 21 in a magnetic coil circuit to balancing coils at D in a balancing coil circuit, the balancing coils D having a fixed air gap (not shown) comparable with a working clearance air gap between coils C of the electromagnet 21 and roll 10. The gauging circuit is completed as shown, through the rectifiers E and F. An indicating galvanometer, such as a millivolt meter at G, is connected in parallelism to the rectifier circuit.

The apparatus is so constructed and arranged that the electromagnetic gauge illustrated is adjustable along the bars 14 and 15 to position the roller 18 in engagement with the roller 10 at one side of the stock 11, which supports the electromagnetic gauge carriage with electromagnet 21 spaced from roller 10 to a distance sufficient to provide a working clearance gap greater than the thickness of the stock to be gauged, as for example, approximating the thickness of the stock plus .050 inch. For beginning a gauging operation, the operator turns micrometer dial 30 until the pointer of meter G reads "0," and then he releases the dial lock 31 and moves the dial 30 to the "0" reading thereof, if necessary, and relocks the dial. That is, the balancing circuit is so constituted, as previously described, that it is balanced when the electromagnet is set at said working clearance from roller 10. The micrometer screw 23 may next be adjusted to move the electromagnet 21 upwardly or away from the roller 10 a distance correspondingly indicated on the dial graduations by a reading equal to the desired gauge for the magnetic stock 11, that is, a distance equal to the desired or normal thickness of the stock 11. Thus the electromagnet will now be spaced from roller 10 by a distance equal to that of the original balanced setting thereof, providing said working clearance gap, plus the desired gauge of the stock 11.

With this last mentioned setting of the electromagnet 21, it will be apparent that so long as the stock 11 passed over roller 10 is of the desired or normal gauge, the air gap between the electromagnet 21 and the surface of the stock 11 will be of the same magnitude as the nonmagnetic gap between the electromagnet 21 and the surface of the roll 10, and the reading on the meter G will be "0."

It will also be apparent that, if the stock 11 should run thicker than normal, the air gap between stock 11 and electromagnet 21 will decrease in magnitude; and if the stock 11 should run thinner than normal, the air gap will increase in magnitude, and these variations will throw the circuit in Figure 3 or a similar circuit out of balance, the degree of which may be indicated on galvanometer G. Galvanometer G may be calibrated to show the variations from normal gauge in thicknesses to 10/1000's of an inch.

Since roller 18 supports the carriage 17 on roller 10, the gauging device has no direct contact with the material 11 being gauged, and will not mark such material to harm the surface finish thereof.

Modifications of the invention may be resorted to without departing from the spirit thereof or the scope of the appended claims.

What is claimed is:

1. A continuous electromagnetic gauging device for sheet or strip magnetic material comprising a work-supporting member of magnetic material over a portion of which sheet or strip magnetic material is engageable to move along a path, supporting means extending transversely of the path of said magnetic material above and in advance of said work-supporting member, a support adjustable along said transversely extending supporting means, means for securing said support on said transversely extending supporting means in various positions transversely or width-wise of the path of the sheet or strip magnetic material, a carriage shiftable upon said support toward and from said work-supporting member and extending in said path of movement of said sheet or strip magnetic material, a supporting element on said carriage for direct engagement with the surface of said work-supporting member adjacent said material-engaging portion thereof, an electromagnet mounted on said carriage so as to overlie said material-engaging portion of said work-supporting member, and means on said carriage for adjusting said electromagnet thereon relatively of said work-supporting member, said adjusting means including a micrometer having a screw for adjusting said electromagnet and a dial member releasably connected to said screw for indicating the adjustment thereof, and means for releasably locking said dial member to said screw.

2. A continuous electromagnetic gauging device for sheet or strip magnetic material comprising a roller of magnetic material over a portion of which sheet or strip magnetic material is engageable to move along a path, supporting means extending transversely of the path of said magnetic material above and in advance of said magnetic roller, a support adjustable along said transversely extending supporting means, means for securing said support on said transversely extending supporting means in various positions transversely or width-wise of the path of the sheet or strip magnetic material, a carriage shiftable upon said support toward and from said magnetic roller and extending in said path of movement of said sheet or strip magnetic material, a supporting roller journaled on said carriage and rotating in frictional engagement with the surface of said magnetic roller adjacent said material-engaging portion thereof, an electromagnet mounted on said carriage so as to overlie said material-engaging portion of said magnetic roller, and means on said carriage for adjusting said electromagnet thereon relatively of said magnetic roller, said adjusting means including a micrometer having a screw for adjusting said electromagnet and a dial member releasably connected to said screw for indicating the adjustment thereof, and means for releasably locking said dial member to said screw.

3. A continuous electromagnetic gauging device for sheet or strip magnetic material comprising a roller of magnetic material over a portion of which sheet or strip magnetic material is engageable to move along a path, a support, a carriage shiftable upon said support toward and from said magnetic roller and extending in said path of movement of said sheet or strip magnetic material, a supporting roller journaled on said carriage and rotating in frictional engagement with the surface of said magnetic roller adjacent said material-engaging portion thereof, an electromagnet mounted on said carriage so as to overlie said material-engaging portion of said magnetic roller, and means on said carriage for adjusting said electromagnet toward and from said magnetic roller, said adjusting means including a micrometer having a screw for adjusting said electromagnet and a dial member releasably connected to said screw for indicating the adjustment thereof, and means for releasably locking said dial member to said screw.

4. A continuous electromagnetic gauging device for sheet or strip magnetic material comprising a roller of magnetic material over a portion of which sheet or strip magnetic material is engageable to move along a path, supporting means extending transversely of the path of said magnetic material above and in advance of said magnetic roller, a support adjustable along said transversely extending supporting means, means for securing said support on said transversely extending supporting means in various positions transversely or width-wise of the path of the sheet or strip magnetic material, a carriage shiftable upon said support toward and from said magnetic roller and extending in said path of movement of said sheet or strip magnetic material, a supporting roller journaled on said carriage and rotating in frictional engagement with the surface of said magnetic roller, adjacent said material-engaging portion thereof, an electromagnet mounted on said carriage so as to overlie said material-engaging portion of said magnetic roller, and means on said carriage for adjusting said electromagnet toward and from said magnetic roller.

5. A continuous electromagnetic gauging device for sheet or strip magnetic material comprising a work-supporting member of magnetic material over a portion of which sheet or strip magnetic material is engageable to move along a path, a support, a carriage shiftable upon said support toward and from said magnetic roller and extending toward the path of movement of said sheet or strip magnetic material, a supporting element on said carriage and in engagement with the surface of said work-supporting member adjacent said material-engaging portion thereof, an electromagnet mounted on said carriage so as to overlie said material-engaging portion of said work-supporting member and means on said carriage for adjusting said electromagnet toward and from said magnetic member.

6. A continuous electromagnetic gauging device for sheet or strip magnetic material comprising a roller of magnetic material over a portion of which sheet or strip magnetic material is engageable to move along a path, a support, a carriage shiftable upon said support toward and from said magnetic roller and extending in said path of movement of said sheet or strip magnetic material, a supporting roller journaled on said carriage and rotating in frictional engagement with the surface of said magnetic roller adjacent said material-engaging portion thereof, an electromagnet mounted on said carriage so as to overlie said material-engaging portion of said magnetic roller, and means on said carriage for adjusting said electromagnet toward and from said magnetic roller.

7. A continuous electromagnetic gauging device for sheet or strip magnetic material comprising a roller of magnetic material over a portion of which sheet or strip magnetic material is engageable to move along a path, supporting means extending transversely of the path of said magnetic material above and in advance of said magnetic roller, a support adjustable along said transversely extending supporting means, means for securing said support on said transversely extending supporting means in various positions transversely or width-wise of said path of the sheet or strip magnetic material, a carriage, means for mounting said carriage on said support in association with said magnetic roller, an electromagnet mounted on said carriage so as to overlie said material-engaging portion of said magnetic roller, means engageable with said magnetic roller adjacent said material-engaging portion thereof to maintain the carriage at a predetermined distance from the magnetic roller, and means on said carriage for adjusting said electromagnet toward and from said material-engaging portion of the magnetic roller, said adjusting means including a micrometer having a screw for adjusting said electromagnet and a dial member releasably connected to said screw for indicating the adjustment thereof, and means for releasably locking said dial member to said screw.

8. A continuous electromagnetic gauging device for sheet or strip magnetic material comprising a roller of magnetic material over a portion of which sheet or strip magnetic material is engageable to move along a path, a carriage, means for continuously supporting said carriage at a predetermined distance from said material-engaging portion of said magnetic roller, an electromagnet mounted on said carriage so as to overlie said material-engaging portion of said magnetic roller, and means on said carriage for adjusting said electromagnet toward and from said material-engaging portion of the magnetic roller, said adjusting means including a micrometer having a screw for adjusting said electromagnet and a dial member releasably connected to said screw for indicating the adjustment thereof, and means for releasably locking said dial member to said screw.

9. A continuous electromagnetic gauging device for sheet or strip magnetic material comprising a roller of magnetic material over a portion of which sheet or strip magnetic material is engageable to move along a path, supporting means extending transversely of the path of said magnetic material above and in advance of said magnetic roller, a support adjustable along said transversely extending supporting means, means for securing said support on said transversely extending supporting means in various positions transversely or width-wise of said path of the sheet or strip magnetic material, a carriage, means for continuously supporting said carriage at a predetermined distance from said material-engaging portion of said magnetic roller, an electromagnet mounted on said carriage so as to overlie said material-engaging portion of said magnetic roller, and means on said carriage for adjusting said electromagnet toward and from said material-engaging portion of the magnetic roller.

10. A continuous electromagnetic gauging device for sheet or strip magnetic material comprising a roller of magnetic material over a portion of which sheet or strip magnetic material is engageable to move along a path, a carriage, means including an element in direct engagement with said roller for supporting said carriage in relatively fixed position with respect to said material-engaging portion of the magnetic roller, an electromagnet mounted on said carriage so as to overlie said material-engaging portion of said magnetic roller, and means on said carriage for adjusting said electromagnet toward and from said magnetic roller.

11. The combination in an electromagnetic gauge for magnetic materials of a support of magnetic material upon which the magnetic material to be gauged may be placed, means spaced from said support a distance somewhat greater than the thickness of the material to be gauged and carrying thereon an electromagnet positioned to overlie said material on said magnetic support, and means for adjusting said electromagnet toward and from said support, said last named means including a micrometer having releasably mounted thereon a dial, and means for releasably locking said dial selectively to secure the same in one of various angular positions on the micrometer.

12. The combination in an electromagnetic gauge for magnetic materials of a support of magnetic material upon a surface portion of which the magnetic material to be gauged may be placed, a holder, means for relatively fixedly mounting said holder to overlie said surface portion of the support, an electromagnet mounted in said holder to be spaced from said surface portion of the support a distance somewhat greater than the thickness of the material to be gauged, and means for adjusting said electromagnet in said holder toward and from said surface portion of the support said last named means including a micrometer having releasably mounted thereon a dial, means for releasably locking said dial selectively to secure the same in one of various angular positions of the micrometer.

AARON G. LADRACH.

REFERENCES CITED

The following references are of record in the file of this patent:

UNITED STATES PATENTS

| Number | Name | Date |
| --- | --- | --- |
| 1,925,904 | Mayne | Sept. 5, 1933 |
| 1,946,924 | Allen et al. | Feb. 13, 1934 |
| 2,051,780 | Brown | Aug. 18, 1936 |
| 2,076,944 | Howe | Apr. 13, 1937 |
| 2,299,997 | Ladrach | Oct. 27, 1942 |
| 1,969,536 | Winne | Aug. 7, 1934 |
| 2,058,518 | Schuster | Oct. 27, 1936 |
| 2,240,184 | Hathawat | Apr. 29, 1941 |
| 2,266,620 | Coffman | Dec. 16, 1941 |

Certificate of Correction

Patent No. 2,438,506.                                                                                                       March 30, 1948.

AARON G. LADRACH ET AL.

It is hereby certified that error appears in the printed specification of the above numbered patent requiring correction as follows: Column 3, line 62, after the word and period "gauges." insert the following:

Stated otherwise in terms of a Wheatstone bridge type of circuit, current from transformer B divides between two resistance branches, one previously termed the balancing coil circuit extending through line $a_1$, coil $d_1$ of balancing coils D, line $a_2$, rectifier E, line $a_3$, coil $d_2$ of balancing coils D, and line $a_4$ back to the transformer, the other resistance branch, previously termed the gauging coil circuit extending in parallelism to the first-mentioned branch through line $a_1$, coil $c_1$ of gauging coil C, line $a_6$, rectifier F, line $a_7$, coil $c_2$ of gauging coils C, and line $a_4$ back to transformer B. The above described parallel connections between the two rectifiers and from the same to the meter G do not affect the balance of the bridge, but when said working clearance air gap of coils C varies from the predetermined setting, the corresponding change in potential in the gauging coil circuit or branch of the bridge will be indicated on the meter G.

and that the said Letters Patent should be read with this correction therein that the same may conform to the record of the case in the Patent Office.

Signed and sealed this 17th day of August A. D. 1948.

[SEAL]

THOMAS F. MURPHY,
*Assistant Commissioner of Patents.*